United States Patent
Heinzl

(10) Patent No.: US 9,625,194 B2
(45) Date of Patent: Apr. 18, 2017

(54) APPARATUS FOR DRYING AND/OR COOLING GAS

(75) Inventor: Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 848 days.

(21) Appl. No.: 13/882,382

(22) PCT Filed: Oct. 5, 2011

(86) PCT No.: PCT/EP2011/004967
§ 371 (c)(1),
(2), (4) Date: Jul. 9, 2013

(87) PCT Pub. No.: WO2012/055477
PCT Pub. Date: May 3, 2012

(65) Prior Publication Data
US 2013/0298590 A1  Nov. 14, 2013

(30) Foreign Application Priority Data
Oct. 29, 2010 (DE) .......... 10 2010 050 042

(51) Int. Cl.
| F25B 43/00 | (2006.01) |
| B01D 61/00 | (2006.01) |
(Continued)

(52) U.S. Cl.
CPC .......... *F25B 43/00* (2013.01); *B01D 53/268* (2013.01); *B01D 61/00* (2013.01); *B01D 63/085* (2013.01);
(Continued)

(58) Field of Classification Search
CPC .... B01D 61/00; B01D 53/263; B01D 53/268; B01D 2313/22; B01D 2317/02; B01D 63/085; F25B 43/00; F24F 3/1417
See application file for complete search history.

(56) References Cited

U.S. PATENT DOCUMENTS

| 1,820,121 A | * | 8/1931 | Cooper | ......... B01D 53/26 95/194 |
| 3,340,186 A |   | 9/1967 | Weyl | |

(Continued)

FOREIGN PATENT DOCUMENTS

| CN | 1751775 | 3/2006 |
| EP | 0088315 A1 | 9/1983 |

(Continued)

OTHER PUBLICATIONS

English-language translation of Office Action issued in Chinese Application No. 2011800530360 (Aug. 28, 2014).

(Continued)

*Primary Examiner* — Len Tran
*Assistant Examiner* — Kirstin Oswald
(74) *Attorney, Agent, or Firm* — Mintz Levin Cohn Ferris Glovsky and Popeo, P.C.; Peter F. Corless; Steven M. Jensen

(57) ABSTRACT

The invention relates to an apparatus (10) for drying and/or cooling gas (12), in particular air, by means of a hygroscopic solution (14), said apparatus comprising an absorption device (16) which comprises at least one gas flow duct (18) and at least one flow duct (20) carrying the hygroscopic solution, wherein the inner or gas chamber (22) of a respective gas flow duct is at least partly delimited by a vapor-permeable liquid-tight membrane wall (24) and at least one flow duct is provided, which is formed between such a gas flow duct and a further such gas flow duct adjacent to the latter or an adjacent cooling unit (26) and which carries the hygroscopic solution, so that moisture, in particular water vapor, passes from the gas into the hygroscopic solution via the membrane wall and is absorbed in said solution.

4 Claims, 7 Drawing Sheets

Figure 1:
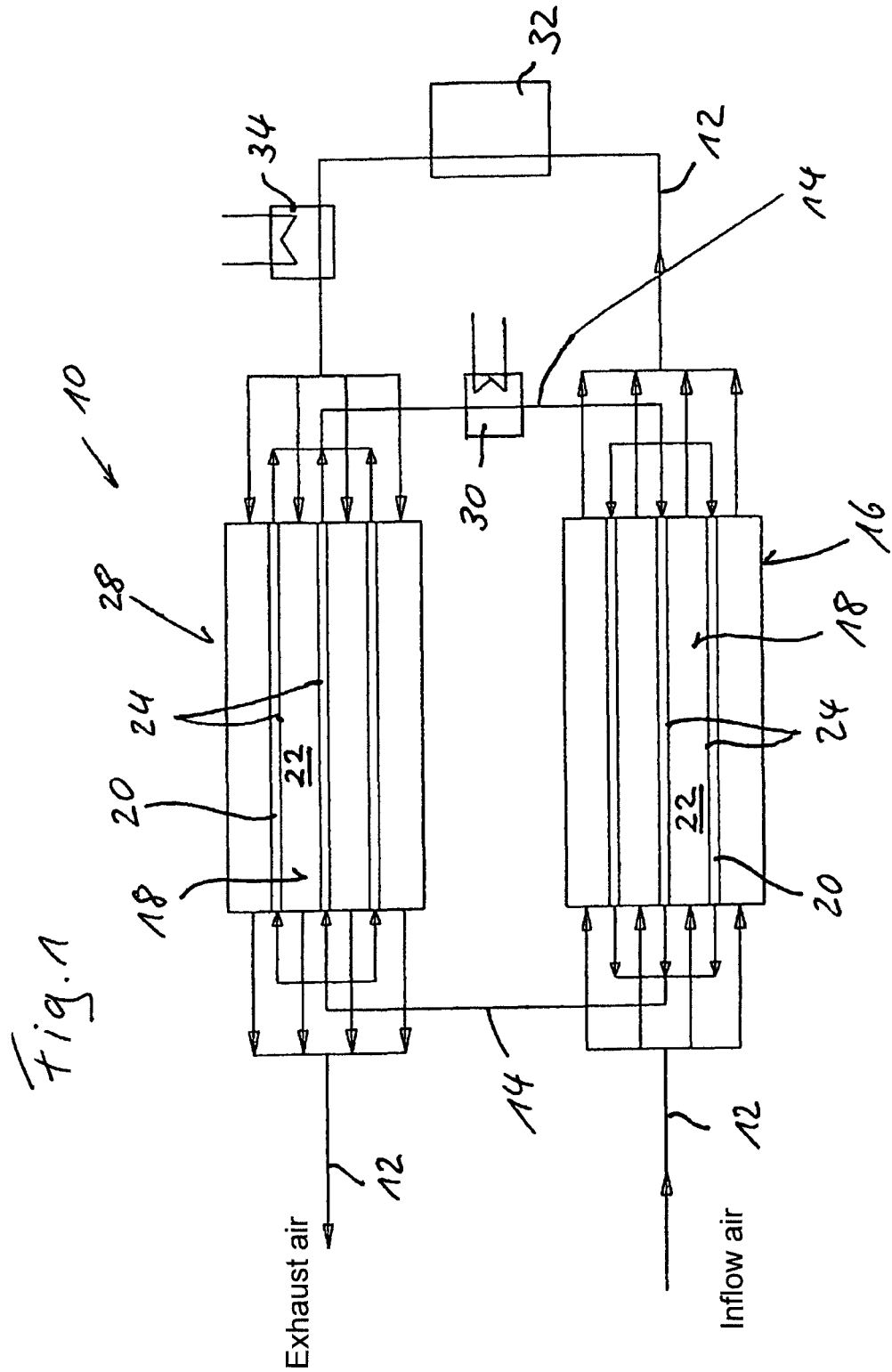

(51) Int. Cl.
*B01D 63/08* (2006.01)
*F24F 3/14* (2006.01)
*B01D 53/26* (2006.01)

(52) U.S. Cl.
CPC .......... *F24F 3/1417* (2013.01); *B01D 53/263* (2013.01); *B01D 2313/22* (2013.01); *B01D 2317/02* (2013.01)

(56) References Cited

U.S. PATENT DOCUMENTS

| | | | | |
|---|---|---|---|---|
| 3,615,199 | A * | 10/1971 | Terrana | B01D 47/06 261/114.1 |
| 3,683,591 | A * | 8/1972 | Glav | B01D 53/261 95/123 |
| 3,878,054 | A * | 4/1975 | Rodgers | B01D 1/10 159/DIG. 27 |
| 4,915,838 | A * | 4/1990 | Bonne | B01D 53/268 210/321.8 |
| 5,020,334 | A * | 6/1991 | Wilkinson | F24F 3/1417 62/271 |
| 5,191,771 | A * | 3/1993 | Meckler | B01D 53/261 62/271 |
| 5,212,956 | A * | 5/1993 | Tsimerman | F24F 3/1411 261/153 |
| 5,440,898 | A * | 8/1995 | Starr | B01D 15/00 210/446 |
| 5,528,905 | A * | 6/1996 | Scarlatti | B01D 53/229 165/229 |
| 5,575,835 | A * | 11/1996 | Bailey | B01D 53/263 62/324.1 |
| 6,134,903 | A * | 10/2000 | Potnis | B01D 53/263 165/154 |
| 6,361,588 | B1 * | 3/2002 | Moratalla | B01D 53/22 55/521 |
| 6,716,355 | B1 | 4/2004 | Hanemaaijer et al. | |
| 6,776,001 | B2 * | 8/2004 | Maisotsenko | F24F 3/1423 261/153 |
| 8,029,675 | B2 | 10/2011 | Heinzl | |
| 8,769,971 | B2 * | 7/2014 | Kozubal | F24F 5/0035 62/92 |
| 2001/0004013 | A1 * | 6/2001 | Morishima | F28D 1/05366 165/153 |
| 2003/0230092 | A1 * | 12/2003 | Lowenstein | F24F 3/1417 62/94 |
| 2004/0099140 | A1 | 5/2004 | Hesse et al. | |
| 2006/0156761 | A1 * | 7/2006 | Mola | B60H 1/3201 65/333 |
| 2009/0000939 | A1 | 1/2009 | Heinzl | |
| 2010/0319370 | A1 * | 12/2010 | Kozubal | F24F 5/0035 62/92 |

FOREIGN PATENT DOCUMENTS

| | | |
|---|---|---|
| EP | 0678321 A2 | 10/1995 |
| EP | 2354710 | 8/2011 |
| JP | 58-216704 | 12/1983 |
| JP | 63-162002 | 7/1988 |
| JP | 01-099631 | 4/1989 |
| JP | 05-146627 A | 6/1993 |
| JP | 07-8744 A | 1/1995 |
| JP | 11 051421 | 2/1999 |
| JP | 2001-241693 A | 9/2001 |
| JP | 2009-514668 A | 4/2009 |
| JP | 2010-501065 A | 1/2010 |
| JP | 2011-511244 A | 4/2011 |
| WO | 0072947 A1 | 12/2000 |
| WO | 2005089914 A1 | 9/2005 |
| WO | 2007054311 A1 | 5/2007 |
| WO | 2008/021648 A1 | 2/2008 |
| WO | 2009/094032 | 7/2009 |

OTHER PUBLICATIONS

Schneider et al., "Membrandestillation", Chemie Ingenieur Technik, vol. 56, No. 7, pp. 514-521 (1984).

* cited by examiner

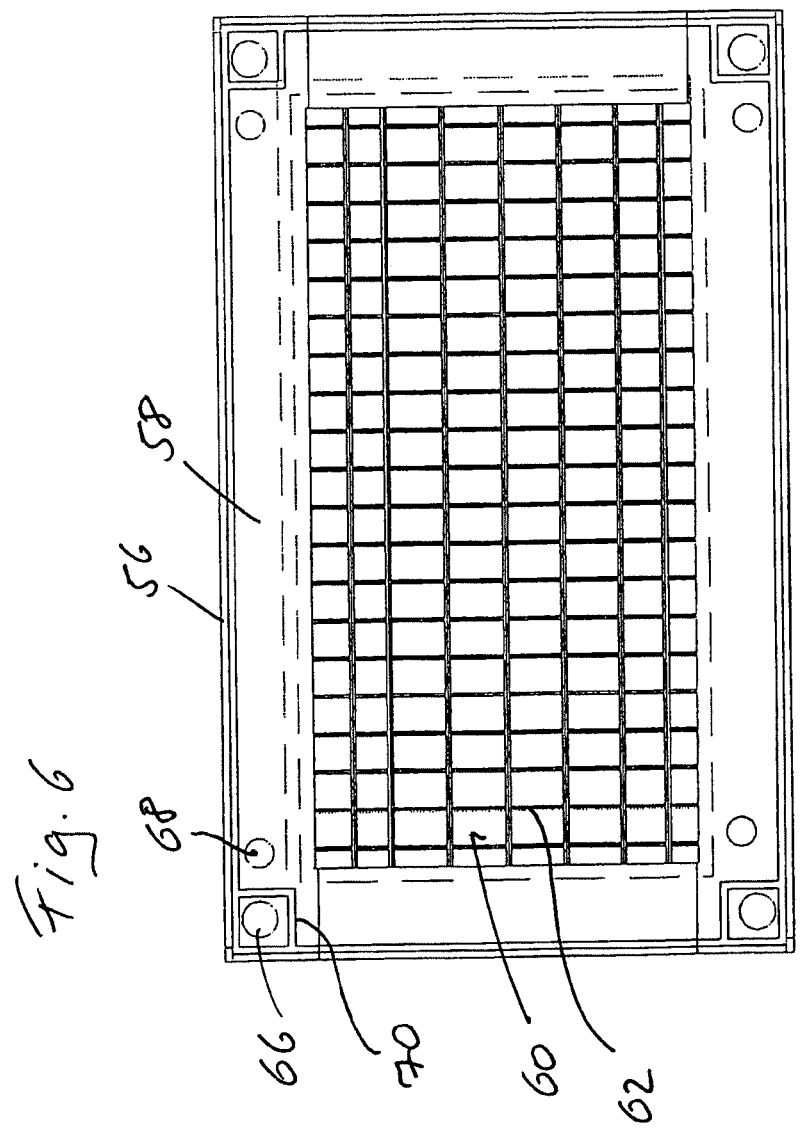

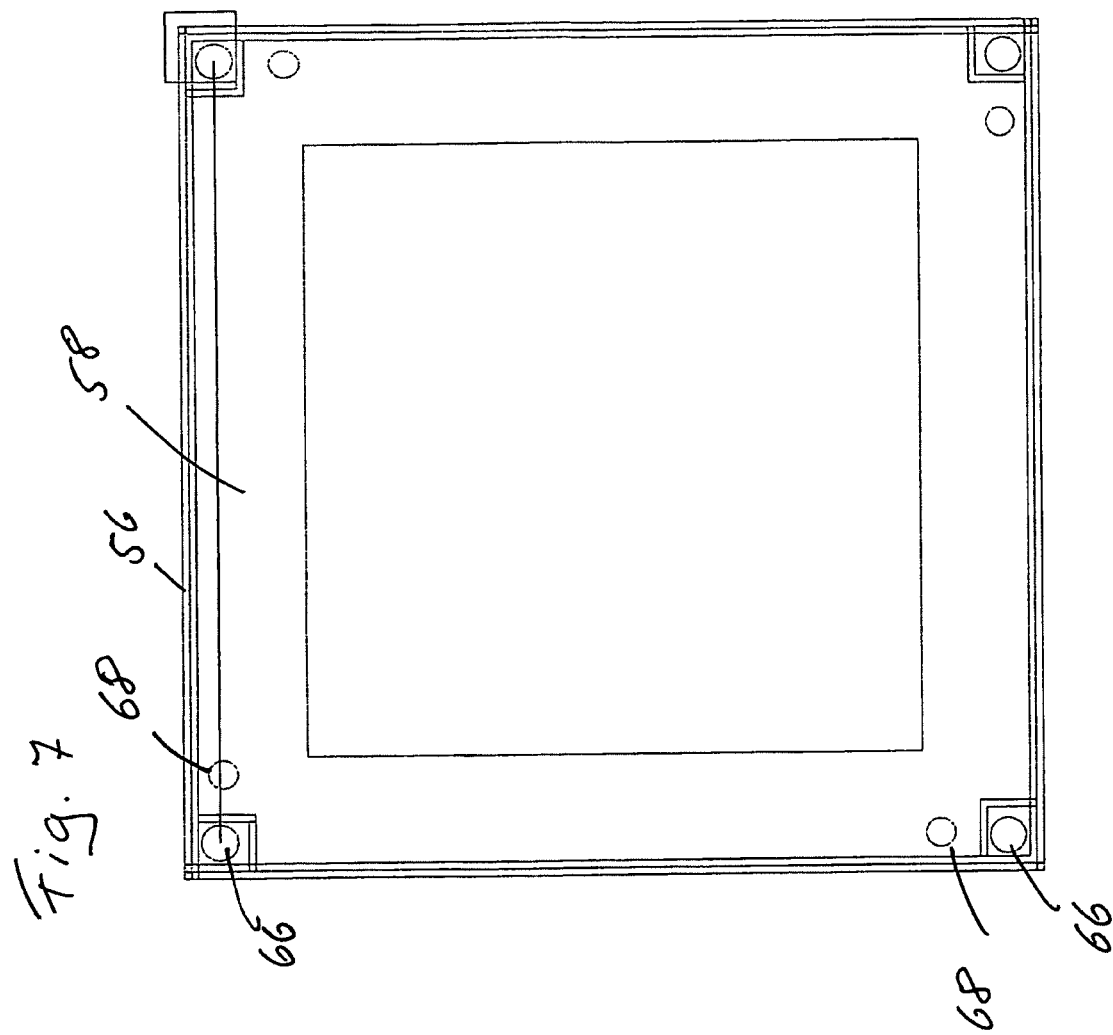

APPARATUS FOR DRYING AND/OR COOLING GAS

CROSS-REFERENCES TO RELATED APPLICATIONS

This application is a 35 U.S.C. §371 U.S. national entry of International Application PCT/EP2011/004967 (WO 2012/055477) having an International filing date of Oct. 5, 2011, which claims under 35 U.S.C. §119 the benefit of German Patent Application No. 10 2010 050 042.9, filed Oct. 29, 2010. The entire contents of both applications are incorporated herein by reference in their entirety.

The invention relates to an apparatus for drying and/or cooling gas, in particular air, by means of a hygroscopic solution. Such an apparatus can be used, for example, in air conditioning plants or the like.

Hygroscopic solutions have the property of binding moisture from the environment. A corresponding hygroscopic solution can comprise, for example, an aqueous saline solution of in particular lithium chloride, lithium bromide, calcium chloride, one of the newly developed, so-called ionic solutions and/or the like. The absorption capability of such a solution increases inter alia as the temperature drops.

It is the object of the invention to provide an improved apparatus of the initially named kind which ensures a drying performance or cooling performance which is as high as possible with a design which is as simple and compact as possible.

This object is satisfied in accordance with the invention by an apparatus for drying and/or cooling gas, in particular air, by means of a hygroscopic solution, having an absorption device which comprises at least one gas flow passage as well as at least one flow passage conducting the hygroscopic solution, wherein the inner space or gas space of a respective gas flow passage is bounded at least partly by vapor-permeable, liquid tight membrane wall and at least one flow passage is provided which conducts the hygroscopic solution and is formed between such a gas flow passage and a further such gas flow passage adjacent thereto or an adjacent cooling unit so that moisture, in particular water vapor, in transferred from the gas via the membrane wall into the hygroscopic solution and is absorbed therein.

The apparatus can be kept relatively simple and compact with a relatively large drying performance and cooling performance due to this design. In particular a larger number of gas flow passages can also be provided without problem, whereby the performance capability can be correspondingly further increased.

The hygroscopic solution flows through the absorption device, preferably in counterflow to the gas.

The absorption device can in particular comprise a plurality of gas flow passages in parallel with one another as well as a plurality of flow passages in parallel with one another and conducting the hygroscopic solution.

The flow passages of the absorption device conducting the hygroscopic solution can, for example, respectively be formed between two mutually adjacent gas flow passages.

Those embodiments are, however, also conceivable in which the flow passages of the absorption device conducting the hygroscopic solution are respectively formed between a gas flow passage and an adjacent cooling unit. A respective cooling unit in this respect preferably comprises a cooling fluid space at least partly bounded by a fluid-tight, heat-conducting cooling fluid space.

In accordance with a preferred practical embodiment of the apparatus in accordance with the invention, the hygroscopic solution exiting the absorption device is supplied to a regeneration device in which it is regenerated. The regenerated hygroscopic solution can then again be supplied to the absorption device.

The regenerated hygroscopic solution can be supplied to the absorption device via a cooler. The absorption capability of the hygroscopic solution reused in the absorption device is further increased by the additional cooling.

The gas exiting the absorption device is preferably supplied to a consumer.

In particular with a consumer with little gas loss, the gas coming from the consumer can be supplied to the regeneration device. It can be of advantage in this respect if the gas coming from the consumer is supplied to the regeneration device via a heat exchanger in which the gas is preferably heated.

Whereas the gas moisture increases again in the consumer, for example, the relative humidity is reduced again by such a heat exchanger.

In specific cases, however, it can also be of advantage if the gas coming from the consumer is led off as exhaust gas or exhaust air.

In this case, gas not coming from the consumer, for example, in particular inflow air such as environmental air, can be supplied to the regeneration device. The regeneration device can, however, generally also be operated without any supplied gas.

If the regeneration device is flowed through by a gas, it is advantageous if the hygroscopic solution flows through the regeneration device in counterflow to the gas.

In accordance with a preferred practical embodiment of the apparatus in accordance with the invention, the regeneration device comprises at least one gas flow passage as well as at least one flow passage conducting the hygroscopic solution, with the inner space or gas space of a respective gas flow passage being at least partly bounded by a vapor-permeable, liquid-tight membrane wall and at least one flow passage being provided which conducts the hygroscopic solution and is formed between such a gas flow passage and a further such gas flow passage adjacent thereto or an adjacent heating unit so that moisture, in particular water vapor, is transferred into the gas from the hygroscopic solution via the membrane wall and the hygroscopic solution is concentrated.

In this respect, the regeneration device advantageously comprises a plurality of gas flow passages in parallel with one another as well as a plurality of flow passages in parallel with one another and conducting the hygroscopic solution.

In this respect, it can be of advantage in specific cases if the flow passages of the regeneration device conducting the hygroscopic solution are respectively formed between two mutually adjacent flow passages.

Such embodiments are, however, also conceivable in which the flow passages of the regeneration device conducting the hygroscopic solution are respectively formed between a gas flow passage and an adjacent heating unit.

A further preferred practical embodiment of the apparatus in accordance with the invention is characterized in that the regeneration device has at least one condensation/evaporation stage which is flowed through by the hygroscopic solution exiting the absorption device and which comprises at least one condensation unit and at least one evaporator unit, with a respective condensation unit comprising a first vapor space at least partly bounded by a condensation wall and a respective evaporator unit comprising a second vapor space at least partly bounded by a vapor-permeable, liquid-tight membrane wall and with at least one flow passage being provided which conducts the hygroscopic solution and is formed between such a condensation unit and such an evaporator unit adjacent thereto so that the hygroscopic solution is heated via the condensation wall and the vapor arising from the hygroscopic solution arrives through the membrane wall in the second vapor space.

In this respect, the regeneration device expediently has a heating stage which is flowed through by the hygroscopic solution exiting the condensation/evaporation stage and which comprises at least one heating unit and at least one evaporator unit, with a respective heating unit comprising a heating fluid space at least partly bounded by a fluid-tight, heat-conducting wall and a respective evaporator unit comprising a vapor space at least partly bounded by a vapor-permeable, liquid-tight membrane, with at least one flow passage being provided which conducts the hygroscopic solution and is formed between a heating unit and an evaporator unit adjacent thereto so that the hygroscopic solution is heated via the fluid-tight, heat-conducting wall and the vapor arising from the hygroscopic solution arrives through the membrane wall in the vapor space and the vapor arising in this vapor space is preferably supplied to a condensation unit of the condensation/evaporation stage.

The regeneration device preferably comprises a condensation stage having at least one cooling unit and at least one condensation unit, with a respective cooling unit comprising a cooling fluid space at least partly bounded by a fluid-tight, heat-conducting wall and a respective condensation unit comprising a vapor space at least partly bounded by a condensation wall and with at least one cooling unit being directly adjacent to at least one condensation unit in the condensation stage so that the condensation wall of the respective condensation unit is cooled via the cooling unit. In this respect, vapor arising in a preceding condensation/evaporation stage is preferably supplied to the condensation stage.

If the regeneration devices comprises the previously mentioned system of at least one condensation/evaporation stage, heating stage and preferably also condensation stage, this system is preferably in a vacuum, the cooling fluid and the heating fluid are preferably at environmental pressure and the hygroscopic solution is preferably in a vacuum. In the condensation stage(s)/evaporation stage(s) and in the heating stage, the hygroscopic solution can in particular be at the boiling temperature corresponding to the absolute pressure in the vapor space of a respective adjacent evaporator unit over all stages, as is described in WO 2007/054311 which is herewith included in the disclosure content of the present application.

A respective heating unit of the heating stage can be flowed through by a heating fluid which is, for example, heated by solar power.

The vapor entering into a respective condensation unit of the condensation/evaporation stage condenses at the condensation surfaces. The corresponding heat is transferred to the hygroscopic solution via the respective surface. The vapor arising therein passes through the membrane of the adjacent evaporator unit into its vapor space which communicates with the pressure of the vapor space of the respective condensation unit of the following condensation/evaporation stage in the case of a plurality of condensation stages/evaporation stages.

In accordance with a preferred practical embodiment of the apparatus in accordance with the invention, it is designed as a modular flow system having a plurality of frame elements. In this respect, the different functional units such as in particular a respective gas flow passage, a respective cooling unit, a respective heating unit, a respective condensation unit and/or a respective evaporator unit are each provided in the form of such a frame element.

The frame elements are preferably provided with web structures via which they can in particular be connected to one another for forming the absorption device, the regeneration device, a respective condensation/evaporation stage, the heating stage and/or the condensation stage.

The frame elements can each comprise an inner region which is surrounded by an outer frame and which is preferably provided with an in particular grid-like spacer to whose two sides a respective corresponding functional surface, preferably in the form of a film or membrane, is in particular applied for forming a respective inner space or gas space, a respective vapor space, a respective heating fluid space or a respective cooling fluid space.

The web structures via which the individual frame elements can be connected to one another can, for example, be welded web structures or bonded structures via which the frame elements are welded or bonded to one another. In the case of welded web structures, a friction welding process, a laser welding process and/or a heating element welding process can be used, for example, for connecting the frame elements.

The gas drying apparatus and/or gas cooling apparatus can be designed in a particularly simple manner and can be varied in the desired manner using the frame elements in accordance with the invention. The frame elements or the units or stages obtained via them are characterized by a relatively simple form and provide different possibilities of the gas supply or air supply, cooling fluid supply and heating fluid supply. The respective drying processes and/or cooling processes as well as the regeneration processes can, for example, be realized only with membrane frame elements or with a combination of membrane frame elements and film frame elements, with frame elements also being conceivable which are provided with a membrane on the one side and with a film on the other side.

Figure 2:
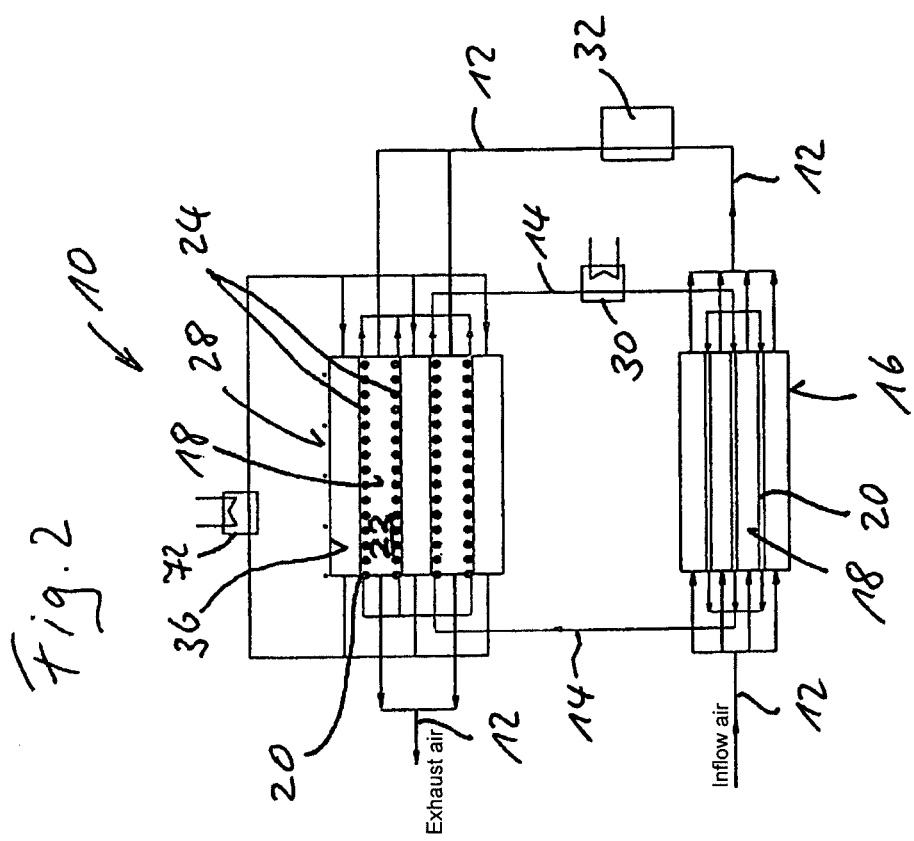
Figure 3:
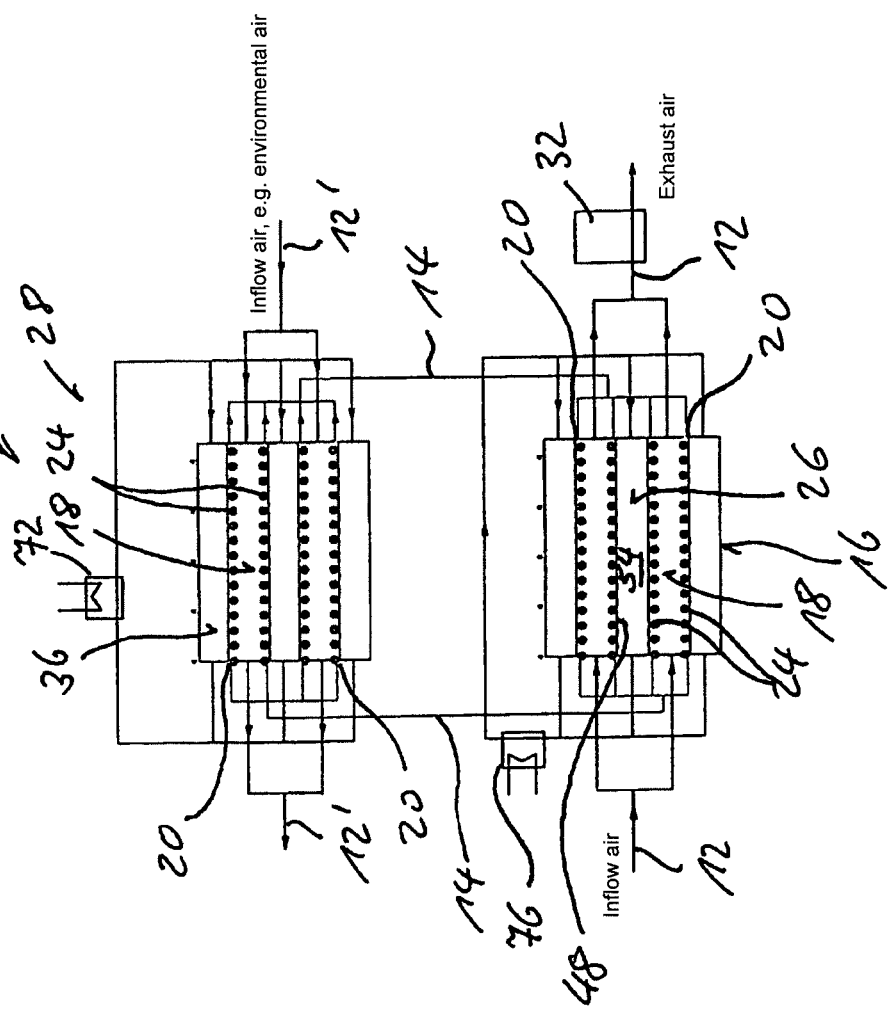
Figure 4:
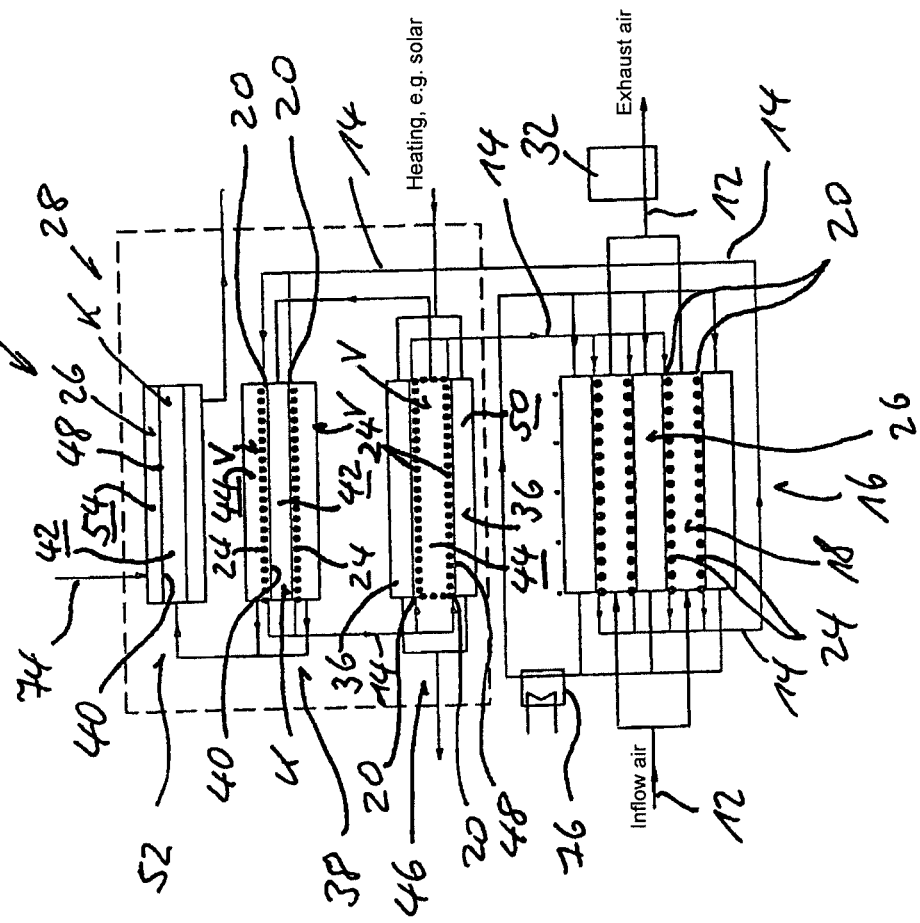
Figure 5:
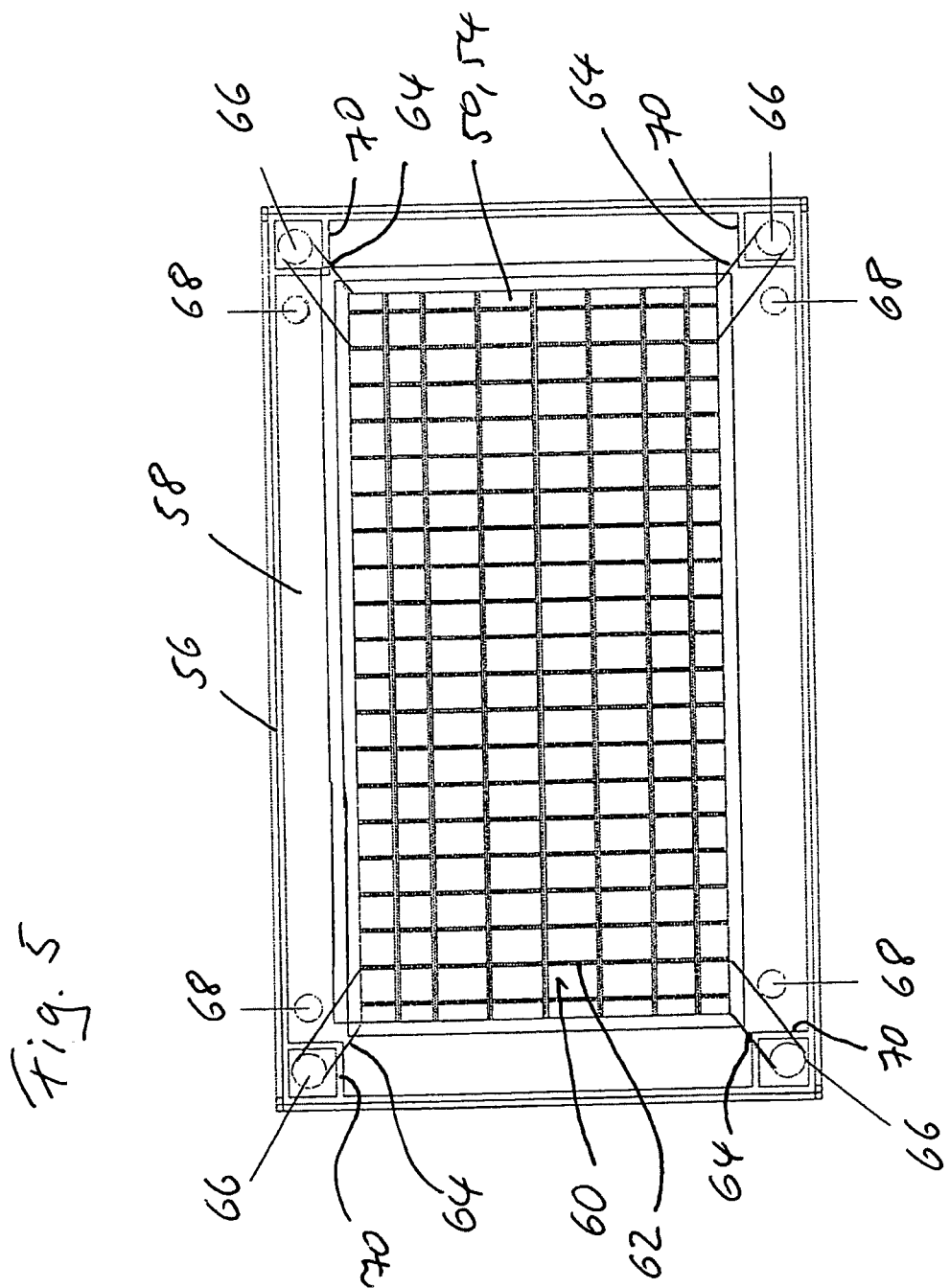

The invention will be explained in more detail in the following with reference to embodiments and to the drawing; there are shown in this:

FIG. 1 a schematic representation of an exemplary embodiment of an apparatus for drying and/or cooling gas in which the gas exiting the absorption device is supplied to a consumer and the gas coming therefrom is supplied to a regeneration device and both the absorption device and the regeneration device each include at least one flow passage conducting the hygroscopic solution and formed between two gas flow passages;

FIG. 2 a schematic representation of an exemplary embodiment of the apparatus comparable with the embodiment in accordance with FIG. 1, with the regeneration device, however, comprising at least one flow passage formed between a gas flow passage and a heating unit and conducting the hygroscopic solution;

FIG. 3 a schematic representation of an exemplary embodiment of an apparatus for drying and/or cooling gas in which the gas coming from the consumer is led off as exhaust gas or exhaust air and gas not coming from the consumer is supplied to the regeneration device and the absorption device comprises at least one flow passage conducting the hygroscopic solution and formed between a gas flow passage and a cooling unit and the regeneration device again comprises at least one flow passage conducting the hygroscopic solution and formed between a gas flow passage and a heating unit;

FIG. 4 a schematic representation of an exemplary embodiment of an apparatus for drying and/or cooling gas in which the gas coming from the consumer is led off as exhaust gas or exhaust air, the absorption device again comprises at least one flow passage formed between a gas flow passage and a cooling unit and conducting the hygroscopic solution and the regeneration device comprises at least one condensation/evaporation stage, a hearing stage and preferably a condensation stage;

FIG. 5 a schematic representation of an exemplary embodiment of a frame element which can in particular be used both as a cooling unit and as a heating unit as well as a condensation unit;

FIG. 6 a schematic representation of an exemplary embodiment of a frame element e.g. forming a gas passage or air passage or an evaporator unit; and FIG. 7 a schematic representation of an exemplary embodiment of a frame element square in cross-section.

Mutually corresponding parts have the same reference numerals associated with them in the different Figures.

FIGS. 1 to 3 show in a schematic representation a respective exemplary embodiment of an apparatus 10 for drying and/or cooling gas 12 by means of a hygroscopic solution 14, with the gas 12 being able to be air, for example.

In this respect, the apparatus 10 comprises an absorption device 16 having at least one gas flow passage 18 as well as at least one flow passage 20 conducting the hygroscopic solution 14. In this respect, the inner space or gas space 22 of a respective gas flow passage 18 is at least partly bounded by a vapor-permeable, liquid-tight membrane wall 24.

At least one flow passage 20 is provided which conducts the hygroscopic solution (14) and is formed between such a gas flow passage 18 and a further such gas flow passage 18 adjacent thereto (cf. FIGS. 1 and 2) or an adjacent cooling unit 26 (cf. FIGS. 3 and 4) so that moisture, in particular water vapor, is transferred from the gas 12 via the membrane wall 24 into the hygroscopic solution 18 and is absorbed therein.

In this respect, the hygroscopic solution 14 can flow through the absorption device 16 in counterflow to the gas 12.

The absorption device 16 can comprise a plurality of gas flow passages 18 in parallel with one another as well as a plurality of flow passages 20 in parallel with one another and conducting the hygroscopic solution 14.

As can be seen from FIGS. 1 and 2, the flow passages 20 of the absorption device 16 conducting the hygroscopic solution 14 can respectively be formed between two mutually adjacent gas flow passages 18.

However, in particular such embodiments are also conceivable in which the flow passages 20 of the absorption device 16 conducting the hygroscopic solution are respectively formed between a gas flow passage 18 and an adjacent cooling unit 26 (cf. FIGS. 3 and 4). In this respect, a respective cooling unit 26 preferably comprises a cooling fluid space 54 at least partly bounded by a fluid-tight, heat-conducting wall 48.

The hygroscopic solution 14 exiting the absorption device 16 can be supplied to a regeneration device 28 in which it is regenerated. The regenerated hygroscopic solution 14 is then preferably again supplied to the absorption device 16.

As can be seen from FIGS. 1 and 2, the regenerated hygroscopic solution 14 can in particular be supplied to the absorption device 16 via a cooler 30.

The gas 12 exiting the absorption device 16 can be supplied to a consumer 32.

It is of advantage in specific cases if the gas 12 coming from the consumer 32 is supplied to the regeneration device 28 (cf. FIGS. 1 and 2).

In this respect, the gas 12 coming from the consumer 32 can be supplied to the regeneration device 28 via a heat exchanger 34 in which the gas 12 is preferably heated.

The gas 12 coming from the consumer 32 can, however, also be led off as exhaust gas or exhaust air (cf. FIGS. 3 and 4).

In this respect gas 12' not coming from the consumer 32, in particular inflow air such as environmental air, can be supplied to the regeneration device 28, for example (cf. FIG. 3). Such embodiments are, however, also conceivable in which the regeneration device 28 is not flowed through either by gas coming from the consumer 32 or by gas not coming from the consumer (cf. FIG. 4, for example).

In the event that the regeneration device 28 is flowed through by gas, the hygroscopic solution 14 can in particular flow through the regeneration device 28 in counterflow to the gas 12, 12' (cf. FIGS. 1 to 3).

As can in particular again be seen from FIGS. 1 to 3, the regeneration device 28 can comprise at least one gas flow passage 18 as well as at least one flow passage 20 conducting the hygroscopic solution 14, with the inner space or gas space 22 of a respective gas flow passage 18 being at least partly bounded by a vapor-permeable, liquid-tight membrane wall 24 and with at least one flow passage being provided which conducts the hygroscopic solution 14 and is formed between such a gas flow passage 18 and such a further gas flow passage 18 adjacent thereto (cf. FIG. 1) or an adjacent heating unit 36 (cf. FIGS. 2 and 3) so that moisture, in particular water vapor, is transferred into the gas 12 or 12' from the hygroscopic solution via the membrane wall 24 and the hygroscopic solution 14 is concentrated.

In this respect, the regeneration device 28 can comprise a plurality of gas flow passages 18 in parallel with one another as well as a plurality of flow passages 20 in parallel with one another and conducting the hygroscopic solution 14 (cf. FIGS. 1 to 3).

In particular in the latter case, the flow passages 20 of the regeneration device 28 conducting the hygroscopic solution can respectively be formed between two mutually adjacent gas flow passages 18 (cf. FIG. 1). Such embodiments are, however, also conceivable in which the flow passages 20 of the regeneration device 28 conducting the hygroscopic solution 14 are respectively formed between a gas flow passage 18 and an adjacent heating unit 36.

The regeneration device 28 can, for example, also have at least one condensation/evaporation stage 38 which is flowed through by the hygroscopic solution 14 exiting the absorption device 16 and which comprises at least one condensation unit K and at least one evaporator unit V (cf. FIG. 4).

In this respect, a respective condensation unit K comprises a first vapor space 42 at least partly bounded by a condensation wall 40 and a respective evaporator unit V comprises a second vapor space 44 at least partly bounded by a vapor-permeable, liquid-tight membrane wall 24. In this respect, at least one flow passage 20 which conducts the hygroscopic solution 14 and is formed between such a condensation unit K and such an evaporator unit V adjacent thereto is provided in a respective condensation/evaporation stage 38. The hygroscopic solution 14 is in this respect heated via the condensation wall 40 and the vapor arising from the hygroscopic solution 14 arrives through the membrane wall 24 in the second vapor space 44.

In addition, the regeneration device 28 can have a heating stage 46 which is flowed through by the hygroscopic solution 14 exiting the condensation/evaporation stage 38 and which comprises at least one heating unit 36 and at least one evaporator unit V (cf. FIG. 4 again).

In this respect, a respective heating unit 36 comprises a heating fluid space 50 at least partly bounded by a fluid-tight, heat-conducting wall 48 and a respective evaporator unit V comprises a vapor space 44 at least partly bounded by a vapor-permeable, liquid-tight membrane wall 24. At least one flow passage 20 which conducts the hygroscopic solution 14 and is formed between a heating unit 36 and an evaporator unit V adjacent thereto is provided in the heating stage 46 so that the hygroscopic solution 14 is heated via the fluid-tight, heat-conducting wall 48 and the vapor arising from the hygroscopic solution 14 arrives through the membrane wall 24 in the vapor space 44. The vapor arising in this vapor space 44 is preferably supplied to a condensation unit K of the condensation/evaporation stage 38 (cf. FIG. 4 again).

As can likewise again be seen from FIG. 4, the regeneration device 28 can also comprise a condensation stage 52 having at least one cooling unit 26 and at least one condensation unit K. In this respect, a respective cooling unit 26 has a cooling fluid space 54 at least partly bounded by a fluid-tight, heat-conducting wall 48 and a respective condensation unit K has a vapor space 42 at least partly bounded by a condensation wall 40. At least one cooling unit 26 is directly adjacent to at least one condensation unit K in the condensation stage 52 so that the condensation wall 40 of the respective condensation unit K is cooled via the cooling unit 26. Vapor arising in a preceding condensation/evaporation stage 38 is preferably supplied to this condensation unit K.

A respective apparatus 10 for drying and/or cooling gas can in particular be designed as a modular flow system having a plurality of frame elements (cf. FIGS. 5 to 7). In this respect, the different functional units such as in particular a respective gas flow passage 18, a respective cooling unit 26, a respective heating unit 36, a respective condensation unit K and/or a respective evaporator unit V are each provided in the form of such a frame element. The frame elements are preferably provided with web structures 56 via which they can in particular be connected to one another for forming the absorption device 16, the regeneration device 28 or a respective condensation/evaporation stage 38, the heating stage 46 and/or the condensation stage 38 of the regeneration device 28. The frame elements can each comprise an inner region 60 which is surrounded by an outer frame 58 and which is preferably provided with an in particular grid-like spacer 62 to whose two sides a respective corresponding functional surface, preferably in the form of a film or membrane, is in particular applied for forming a respective inner space or gas space 22, a respective vapor space 42, 44, a respective heating fluid space 50 or a respective cooling fluid space 54 etc.

In this respect, a respective membrane can in particular take over the function of a membrane wall 24 and a respective film can in particular take over the function of a condensation wall 40 or of a fluid-tight, heat-conducting wall 48.

The different frame elements can, for example, be welded or adhesively bonded to one another via the web structures. If, for example, welding web structures are used, a friction welding process, a laser welding process and/or a heating element welding process can be used for connecting the frame elements, for example.

FIG. 5 shows in a schematic representation an exemplary embodiment of a frame element which can be used, for example, both as a cooling unit and as heating unit 26 and 36 respectively. The spacer 62 can in particular be provided with a respective film on both sides in the present case. The heating fluid space or cooling fluid space 50 or 54 respectively formed between the films is flowed through by heating fluid or cooling fluid, e.g. water. The heating fluid or cooling fluid is supplied to and again removed from the heating fluid space or cooling fluid space 50 and 54 respectively via passages 64, for example water passages. The passages 64 are connected to leadthroughs 66 in particular provided in the corner regions of the frame element and in particular for the heating fluid or cooling fluid. Leadthroughs 68 are additionally in particular provided for the hygroscopic solution 14 in particular in the region of the leadthroughs 66.

The leadthroughs 66, 68 provided on the left hand side of FIG. 5 can be provided, for example, for a heating fluid inlet or cooling fluid inlet or for a solution inlet and the leadthroughs 66, 68 provided on the right hand side of FIG. 5 can be provided, for example, for a heating fluid outlet or cooling fluid outlet or for a solution outlet. The inlet and outlet for the fluid or the solution respectively can, however, also generally be otherwise arranged. Parallel flows, counter flows or crossflows can be realized, for example, via these leadthroughs 66, 68.

The frame element is, for example, rectangular in cross-section in the present case. Generally, however, a square form is also conceivable, for example (cf. FIG. 7, for example).

The leadthroughs 66 can, for example, respectively be delineated toward the inner region 60 by a web section 70.

The frame element in accordance with FIG. 5 having films in particular provided at both sides can in particular also be provided as a condensation unit K, with in this case a corresponding vapor space 44 being able to be formed between the films.

FIG. 6 shows in a schematic representation an exemplary embodiment of a frame element e.g. forming a gas flow passage, an air flow passage or an evaporator unit V. In the present care, a respective vapor-permeable, water-tight membrane can in particular be applied to both sides of the spacer 62. The frame element can in particular be open toward the inner region 60 e.g. on the two narrow sides for forming a gas flow passage or an air flow passage.

Leadthroughs 66, 68 as well as web sections 70 can also be recognized in the representation in accordance with FIG. 6.

This frame element shown in FIG. 6 is also again rectangular in cross-section.

The films and membrane can, for example, be adhesively bonded or welded to the frame elements. A different kind of fastening of these films and membranes is generally also conceivable.

FIG. 7 shows in a schematic representation an exemplary embodiment of a frame element square in cross-section. In this respect, in particular leadthroughs 66, 68 can also again be recognized in this representation.

In the case of this frame element having a square cross-section, the leadthroughs 66, 68 are arranged rotationally symmetrically. On a rotation by 90°, leadthroughs of the same function therefore always come to line on one another in plan view. Classical crossflow apparatus can also be designed using such an arrangement. Such a circuit is achieved by rotating the frame elements by 90°.

In another respect, this frame element can in particular again be designed such as was described with reference to FIGS. 5 and 6.

The different frame elements can therefore be arranged relative to one another according to the function to be satisfied. In this respect, for example, a frame element provided in the form of a condensation unit K can in particular be spanned by condensation film and a frame element provided in the form of an evaporator unit V can in particular be spanned by membrane. A respective flow passage 20 conducting the hygroscopic solution 14 results between the membrane and the film by the bringing together of a frame element provided in the form of a condensation unit K and provided with a film and of a frame element provided in the form of an evaporator unit V and provided with a membrane. A spacer can still be inserted in this flow passage 20. Instead of such a spacer, the in particular grid-like spacer 46 can also be designed, for example, such that defined passages for conducting the solution are formed on the filling of the flow passage 20.

As results from FIG. 1, a heat and mass transfer device can be realized using membrane frame elements, for example. Moist and hot air can, for example, be sent through the heat and mass transfer device which is an air cooler and air dryer in one.

So much concentrated hygroscopic solution can, for example, be conducted in counterflow through the flow passage bounded by membranes and conducting the hygroscopic solution that the air or gas flowing over the membranes is both dried and cooled. The solution is in this respect diluted and heated. The cooled and dried air is supplied to the consumer, for example to a ship or the like. In the consumer the air is heated again by loads such as electrical consumers and persons and the air humidity is increased by the consumer or by the persons. The return air, which in particular almost corresponds to the inflow air in large ships such as cruise ships, can be heated in a heat exchanger so that the relative humidity drops. In the desorber or regeneration device, this air comes into contact with the diluted solution via the membrane. Water is now expelled from the diluted solution. The solution is concentrated and is cooled by the evaporation of the water. In an optional downstream cooler, the concentrated solution can be cooled even further and can be supplied to the absorption device again.

As can be seen from FIG. 2, for example, the heat and mass transfer device or the absorption device can, for example, be realized using membrane frame elements and the regeneration device can, for example, be realized using membrane frame elements and film frame elements. The regenerator or desorber is here therefore made up of membrane frame elements and film frame elements. Warm water flows, for example through the film frame elements in the desorber or regeneration apparatus and heats the solution and expels water from the solution. The evaporation heat is here provided, for example, by cooling the hot water from the heating circuit. The air flowing in from the consumer is also heated via the heated solution and can take up moisture. The concentrated solution can be cooled via a cooler downstream of the desorber or regeneration device.

As can be seen from FIG. 3, a cooled absorber or a cooled absorption device and a heated desorber or a heated regeneration device can be provided. Such a combination is in particular of advantage when outside air is respectively used for the absorber and the desorber in the respective plant. This is also a suitable process for a cold storage in a concentrated solution since a larger water charge of the solution can be achieved in the cooled absorber. The absorption and desorption can here also take place at separate locations. The concentrated solution could then be delivered to the consumer as a cold store. The diluted solution could then be returned.

As can be seen from FIG. 4, a cooled absorber or a cooled absorption device can be provided in combination with a regeneration device which comprises a system serving for the concentration of the hygroscopic solution and having at least one condensation/evaporation stage as well as a heating stage and preferably a condensation stage. In this respect, the system within the broken line of FIG. 4 is in a vacuum. The cooling fluid and the heating fluid are at environmental pressure and the solution is in a vacuum. The circumstances are in this respect substantially as is described in WO 2007/054311. Such a combination is in particular efficient when no waste heat is available for the desorption of the solution. The energy requirement for the desorption can be considerably reduced over the number of different stages using a correspondingly multistage concentration process. It is also of particular advantage that distilled water arises in the desorption process, that is water is acquired from the moist air.

As can be seen from FIGS. 2 and 3, a heat exchanger 72 can, for example, be provided in the respective heating fluid circuit of the regeneration device 28.

As can be seen from FIG. 4, cooling water 74 can, for example, be supplied to the condensation stage 52 or to its cooling units 26. The heating fluid for the heating units 36 of the heating stage 46 can be heated by solar power, for example.

As can be seen from FIGS. 3 and 4, for example, a cooler 76 can be associated with the cooling fluid circuit of the absorption device or of the cooled absorber.

Instead of air, any desired other gas can generally also be provided. In addition, water vapor does not necessarily have to be removed in the respective dehumidification. Any desired other mass transfer can also take place on the dehumidification.

REFERENCE NUMERAL LIST 10 apparatus for drying and/or cooling gas
12 gas
12' gas not coming from the consumer
14 hygroscopic solution
16 absorption device, absorber
18 gas flow passage
20 flow channel conducting the hygroscopic solution
22 inner space or gas space
24 membrane wall
26 cooling unit
28 regeneration device, desorber
30 cooler
32 consumer
34 heat exchanger
36 heating unit
38 condensation/evaporation stage
40 condensation wall
42 first vapor space
44 second vapor space
46 heating stage
48 fluid-tight, heat-conducting wall
50 heating fluid space
52 condensation stage
54 cooling fluid space
56 web structure
58 outer frame
60 inner region
62 spacer
64 passage
66 leadthrough for the heating fluid or cooling fluid 68 leadthrough for the hygroscopic solution
70 web section
72 heat exchanger
74 cooling water
76 cooler
K condensation unit
V evaporator unit

The invention claimed is:

1. An apparatus for drying and/or cooling gas by means of a hygroscopic solution, comprising:
an absorption device which comprises at least one gas flow passage and at least one flow passage conducting the hygroscopic solution, wherein an inner space or gas space of the gas flow passage is at least partly bounded by a vapor-permeable, liquid tight membrane wall and the flow passage is provided which conducts the hygroscopic solution and is formed between the gas flow passage and a further gas flow passage adjacent thereto or an adjacent cooling unit so that moisture is transferred from the gas via the membrane wall into the hygroscopic solution and is absorbed therein,
wherein the absorption device comprises a plurality of gas flow passages in parallel with one another, and a plurality of flow passages in parallel with one another and conducting the hygroscopic solution; and
the flow passages of the absorption device conducting the hygroscopic solution are respectively formed between the gas flow passage and the adjacent cooling unit, the cooling unit comprising a cooling fluid space at least partly bounded by a fluid-tight, heat-conducting wall,
wherein the hygroscopic solution flows through the absorption device in counterflow to the gas, the hygroscopic solution exiting the absorption device is supplied to a regeneration device in which it is regenerated, and the regenerated hygroscopic solution is again supplied to the absorption device,
wherein the regeneration device comprises at least one gas flow passage and at least one flow passage conducting the hygroscopic solution, with an inner space or gas space of the gas flow passage being at least partly bounded by a vapor-permeable, liquid-tight membrane wall and with the flow passage being provided which conducts the hygroscopic solution and is formed between the gas flow passage and a further gas flow passage adjacent thereto or an adjacent heating unit so that moisture is transferred into the gas from the hygroscopic solution via the membrane wall and the hygroscopic solution is concentrated,
wherein the regeneration device comprises a plurality of gas flow passages in parallel with one another, and a plurality of flow passages in parallel with one another and conducting the hygroscopic solution, and
wherein, in the regeneration device, a portion of each of the flow passages conducting the hygroscopic solution has a first side and a second side opposite to the first side, the first side being directly adjacent to a respective gas flow passage and the second side being directly adjacent to a respective heating unit.

2. An apparatus in accordance with claim 1 wherein the regenerated hygroscopic solution is supplied to the absorption device via a cooler.

3. An apparatus in accordance with claim 1 wherein gas coming from a consumer is supplied to the regeneration device.

4. An apparatus in accordance with claim 3 wherein the gas coming from the consumer is supplied to the regeneration device via a heat exchanger in which the gas is heated.

* * * * *